United States Patent

Van Nassau et al.

[15] 3,697,521

[45] Oct. 10, 1972

[54] INTEGRATED PROCESS FOR THE PREPARATION OF UREA AND MELAMINE

[72] Inventors: Petrus J. M. Van Nassau, Geleen; Wilhelmus K. Brand, Munstergeleen; Petrus J. C. Kaasenbrood, Sittard, all of Netherlands

[73] Assignee: Stamicarbon N.V., Heerlen, Netherlands

[22] Filed: Dec. 15, 1970

[21] Appl. No.: 98,466

[30] Foreign Application Priority Data

Dec. 20, 1969 Netherlands..............6919152

[52] U.S. Cl. .......................260/249.7 A, 260/555 A
[51] Int. Cl. .............................................C07d 55/28
[58] Field of Search.......................260/249.7, 555 A

[56] References Cited

UNITED STATES PATENTS

| | | | |
|---|---|---|---|
| 3,290,308 | 12/1966 | Marten | 260/249.7 |
| 3,310,558 | 3/1967 | Oele et al. | 260/249.7 |
| 3,492,302 | 1/1970 | Abe et al. | 260/249.7 |
| 3,503,970 | 3/1970 | Kanai et al. | 260/249.7 |
| 3,239,522 | 3/1966 | Cook et al. | 260/249.7 |
| 3,544,628 | 12/1970 | Hsu | 260/249.7 |

*Primary Examiner*—John M. Ford
*Attorney*—Cushman, Darby & Cushman

[57] ABSTRACT

An integrated process for the preparation of urea and melamine is described wherein heat requirements for the decomposition of ammonium carbamate contained in the urea product solution, which is cycled as feed to the melamine synthesis stage, is supplied, at least in part, from the heat released by the desublimation of the melamine vapors obtained in the melamine synthesis gas product stream, by bringing this gas stream into direct contact, either in counter-current or co-current flow, with the ammonium carbamate-containing urea product solution.

4 Claims, No Drawings

INTEGRATED PROCESS FOR THE PREPARATION OF UREA AND MELAMINE

The invention relates to an integrated process for the preparation of urea and melamine, by synthesis of urea from ammonia and carbon dioxide and conversion of at least part of this urea into melamine, and with processing for use in the urea synthesis stage of the gas mixture obtained from the melamine synthesis stage, this gas mixture containing the ammonia, carbon dioxide and, possibly, water vapor components which remain after the melamine vapors formed have been separated off therefrom.

As is already known, urea is conventionally prepared by compressing $NH_3$ and $CO_2$ to a high pressure, e.g., 100–400 atm., in which $NH_3$ and $CO_2$ first form ammonium carbamate. The prevailing pressure and temperature conditions in the urea reactor cause the ammonium carbamate to be partially converted into urea, with release of one mol of water for each mol of urea.

This urea reaction is an equilibrium reaction, in which a considerable portion of the ammonium carbamate remains unconverted. As a result the urea synthesis solution discharged from the urea reactor has an appreciable ammonium carbamate content.

By supplying heat to the urea synthesis effluent solution it is possible to decompose the ammonium carbamate in the solution and remove the decomposition products in a mixture of ammonia, carbon dioxide and water vapor. This gas mixture may then be condensed again to form a melt or solution of ammonium carbamate, possibly with introduction of additional water. The resulting ammonium carbamate melt or solution can then be recycled to the urea synthesis reactor.

The removal (by endothermic decomposition) of the ammonium carbamate from the urea synthesis solution, and the evaporation, during the processing of the urea solution obtained, of the water formed in the urea synthesis (1 mol. of water per mol. of urea) requires, of course, considerable heat energy input.

A conventional melamine synthesis procedure is a catalytic process wherein urea, in the presence of ammonia, or of a gas stream, which contains both ammonia and carbon dioxide, is converted into melamine, ammonia and carbon dioxide, usually at a superatmospheric pressure of about 5 to 10 atmospheres and at a temperature of approximately 400° C. The melamine product formed is discharged, in vaporous form, from the catalyst-filled reactor, along with the other gases. Thereafter, the melamine vapor is desublimated by cooling and is separated from the gases. The remaining gases may then be recycled to the urea synthesis either as such, or after dissolution thereof in water to form an ammonium carbamate solution.

The object of the present invention is to provide an improved integration of the urea and melamine syntheses, in such a way that improved economics of the heat energy utilization can be achieved.

This goal may be effected by utilizing, in the integrated process, the heat liberated during the desublimation of melamine, as well as sensible heat released from the gases discharged from the melamine synthesis, as the heat utilized for the endothermic decomposition of the unconverted ammonium carbamate compounds and expelling of the ammonia and carbon dioxide components from the urea synthesis solution.

Another purpose of the invention is to achieve, in the integrated process, an improved utilization of the heat liberated during the dissolution of the melamine-freed gas mixture The invention further seeks to carry out the heat transfer steps with the use of as few as possible heat-exchanging surfaces.

According to this invention, these purposes can be realized by first contacting the gases which contain melamine vapor, and which have been discharged from the melamine synthesis zone, directly with a urea solution obtained from the urea synthesis, which solution contains ammonium carbamate. The sensible heat of the gases which contain melamine vapor and the evolving sublimation heat of the melamine are thus directly utilized to cause the endothermic decomposition reaction of the ammonium carbamate present in the urea solution into ammonia and carbon dioxide, and to expel these resulting gases from the urea solution. Thereafter, the expelled gages, together with the gas stream freed from melamine vapor (possibly after compression) are condensed into an ammonium carbamate solution. The heat evolving during this condensation is again utilized in a suitable way, e.g., either for the evaporation of water out of the urea solution which has been freed from ammonium carbamate, or for the recrystallization of the melamine crystals which have been separated off.

The ammonium carbamate-containing urea solution, which is utilized for the desublimation of the melamine, need not be the specific urea reaction effluent available straight from the urea synthesis reactor. This urea solution may first have been freed from part of its original ammonium carbamate content in another way, e.g., by a stripping operation with $NH_3$ or $CO_2$, or by a preliminary expansion and heating, if desired.

However, for an optimum heat economy, it is of importance that the heat energy available in the melamine vapor-containing gas stream correspond with that necessary (1) to decompose the ammonium carbamate contained in the urea solution with which it is brought into contact, and (2) to expel gases evolved during the decomposition.

Consideration must thus be given to the total heat quantities which are set free when the synthesis gases which contain melamine vapor are cooled. This includes the heat released from (1) the transformation of melamine vapors into melamine crystals, and from (2) cooling the melamine crystals thus formed, and from (3) cooling the $NH_3$ and $CO_2$ present from 380° C to 150° C. These available heat energy quantities should be balanced with the heat required for (1) the dissolution of at least part of the melamine in the urea solution, and for (2) the heating, if necessary, of the urea solution, and for (3) the decomposition of ammonium carbamate and for (4) expelling of the gases from the liquid. By suitable consideration of these factors, a heat balance can be prepared from which there can be calculated the quantity of the urea solution which is necessary for a given amount of melamine-containing gas to be cooled and freed from melamine.

For instance, in the case of the cooling of 1000 kg of a synthesis gas at 390° C and containing 12% by weight of melamine vapor down to 150° C a total of $17.9 \times 10^4$ kcal of heat energy will be released. This released heat can be absorbed by, for instance, 820 kg of an expanded urea synthesis solution at 75° C, and containing 26 percent by weight of ammonium carbamate, or by 860 kg of urea synthesis solution at 190° C, and which contains 44 percent by weight of ammonium carbamate.

By application of the procedures according to the invention, the integration of the preparation of urea and melamine can be enhanced by separating the suspension (in a urea solution) of melamine crystals, (which suspension is obtained during the cooling of the hot gases), and by processing the urea solution into a urea melt which is virtually free from water, whereupon this melt may be used as feed for the melamine preparation.

The processing of the urea solution into a urea melt may be carried out in two (2) steps, viz., in a first step in which the urea is subjected to a vacuum-crystallization and the urea crystals are separated from the mother liquor, following which, in a second step the urea crystals are melted.

In such a case the heat requirements for the vacuum-crystallization of the urea can be supplied by the heat which is released when the ammonia and carbon dioxide present in the gases are dissolved to form an ammonium carbamate solution. These gases are discharged after the contact between the melamine synthesis gases with the urea solution which contains the ammonium carbamate.

By then contacting the synthesis gases containing hot melamine with the urea solution which contains ammonium carbamate, one obtains, depending on the amount of liquid used, a suspension of melamine crystals in a melamine-saturated urea solution, or a melamine-containing urea solution (when a greater quantity of cooling liquid is used).

By continued cooling, melamine can again be made to crystallize out of the latter urea solution and the crystals may then be separated from the liquid.

The process according to this invention will be further understood with the aid of the accompanying drawing, giving a schematic survey of the process and of the equipment required.

According to this drawing, molten urea is supplied via line 2 to melamine synthesis reactor A, and ammonia gas, (which may, if necessary, contain carbon dioxide) is supplied via line 3. The reactor is filled with catalyst particles, e.g., silica gel, which are kept at the required temperature by heating coil 1.

The synthesis gases, at, e.g., a temperature generally in the range of 350° to 400° C under a pressure of 1 to 25 atm and containing 10–15 percent by weight of melamine, are discharged from the reactor through line 4, and are purified from catalyst dust in the filter device D.

Subsequently, these gases are delivered via line 5 to desublimator B where they are contacted with a urea and ammonium carbamate-containing solution obtained from urea synthesis stage (not illustrated in the drawing), said solution generally containing 15 to 45 percent by weight of ammonium carbamate and -before expansion in relief valve 7 - having a temperature in the range of 50°–190° C and being under a pressure of 10–150 atm. being supplied continuously to desublimator B via line 6 and relief valve 7.

In the desublimator B the urea/ammonium carbamate solution is distributed over vertically arranged plates 8 along which it flows as a film and in co-current flow direct contact with the gas stream (from line 5) which contains the melamine vapor. This gas stream is thus cooled to such an extent that the melamine vapor contact of said gas stream desublimates. As a result a suspension, and/or solution, of melamine crystals in the said urea solution, accumulates in the bottom section of the desublimator B.

The melamine suspension and/or solution thus obtained is led to the centrifuge or to another separating device C via buffer tank E, relief valve 9, separating vessel F and line 10. Wash water is fed to the separating centrifuge device C through line 11. Melamine crystals, thus cleaned by water washing, leave the system via line 12; while the urea-containing mother liquor solution thus obtained, which has now been diluted with the wash water, is introduced through line 13 into the vacuum-crystallization system G, wherein a concentrated urea solution is formed and crystallized.

Evaporated water is discharged from G by means of line 14. The urea crystals thus recovered may be dried in a dryer (not shown), and sent to the urea melter H via line 15, from which they are supplied to the melamine synthesis reactor A via line 2.

Line 16 is used to lead the melamine-freed gases from B to the condenser K, where the gases are contacted with a dilute ammonium carbamate or carbonate solution, which is the bottom product, flowing out of rectifying column L, through line 20. Said gases are thus condensed into ammonium carbamate. The heat of condensation thus liberated in condenser K is now utilized according to one feature of the invention to cause water to evaporate from the urea mother liquor solution in G, which solution is supplied, circulated and discharged through the pipe system 18 with the aid of pump 18b, between units G and K.

The ammonium carbamate solution formed in condenser K is sent through line 17 to a urea synthesis stage (which is not shown in the drawing). The gases which have not been condensed in condenser K pass through line 19 into the bottom section of the rectifying column L, where they may now be condensed, in contact with the bottom liquid therein, to form a solution of ammonia and ammonium carbamate. As top product uncondensed ammonia gas is discharged as overload from the rectifying column L and recycled via compressor M and line 3, optionally filled with preheaters (not shown) to the melamine synthesis reactor.

The heat required in rectifying column L is wholly, or at least largely, supplied by the heat of condensation released from the gases delivered thereto via the lines 19 and 16a (which carries bypass gases from line 16 directly to the rectifier L.

The gas phase obtained by expansion as overload in separating vessel F, and which contains ammonia, carbon dioxide and water vapor, is introduced via line 21 into condenser J, which operates at about atmospheric pressure. The gases condense in J with water supplied through line 22, to form a dilute ammonium carbamate solution.

This dilute ammonia carbamate solution from J is then led into the rectifying column L by means of pump 23, where it serves as the wash liquid for the ascending vapors from lines 16a and 19.

Line 25 is used to vent inert gases from the urea synthesis stage (not shown) which vented gases are supplied to J by line 24 and from which traces of $NH_3$ and $CO_2$ may still be recovered in condenser J.

In the process according to the drawing, the gases which contain hot melamine vapor are in co-current flow contacted with the urea solution in the desublimator; it is also possible, however, for the gases which contain melamine vapor to be contacted with the ammonium carbamate solution in counter-current flow. However, in any event, there is direct contact between the gases and the solution.

The invention will now be further elucidated by the following numerical example. Weight amounts represent hourly rates.

EXAMPLE

Melamine synthesis reactor A, operating at 380° C and 10 atm., is supplied via line 2 with 3175 kg of urea melt, in which 79 kg of melamine is dissolved, while 5858 kg of $NH_3$ is supplied as reactang and fluidization gas via line 3.

The melamine synthesis gas mixture evolved through line 4 contains, in addition to 1080 kg of melamine vapor, 6758 kg of $NH_3$, 1048 kg of $CO_2$ and 228 kg of HCNO.

In the desublimator B this gas mixture is contacted with a solution (from line 6) containing urea and ammonium carbamate, which has been expanded to 10 atm. and is at a temperature of 72° C, and contains 3016 kg of urea, 2534 kg of water, 1367 kg of ammonium carbamate and 542 kg of free $NH_3$. The melamine suspension is discharged from desublimator B to buffer tank E at a temperature of 155° C, and its composition is as follows:

| | |
|---|---|
| Melamine crystals | 591 kg |
| Melamine in solution | 489 kg |
| Urea | 3175 kg |
| $H_2O$ | 1632 kg |
| Ammonium carbamate | 154 kg |
| Ammonia | 145 kg |

This suspension is expanded to atmospheric pressure at valve 9, and, per hour, the suspension, at a temperature of 106° C, is led from the separating vessel F, which is equipped with a cooling coil, to the centrifuge C, the said suspension now having the composition:

| | |
|---|---|
| Melamine crystals | 962 kg |
| Melamine in solution | 117 kg |
| Urea | 3175 kg |
| $H_2O$ | 1175 kg |

1000 kg of melamine are discharged from the centrifuge, while the wash water quantity amounts to 318 kg and the mother liquor quantity (temperature 80° C) consists of:

| | |
|---|---|
| Urea | 3175 kg |
| Melamine | 79 kg |
| $H_2O$ | 1492 kg |

These 1492 kg of water are made to evaporate in the vacuum crystallizer G, which operates at 60° C.

Meanwhile, the gas stream discharged through line 16 from the desublimator B has a temperature of 150° C and is composed of:

| | |
|---|---|
| $NH_3$ | 7680 kg |
| $CO_2$ | 1851 kg |
| $H_2O$ | 854 kg |

73 percent of this gas stream is introduced into condenser K and the remainder into the bottom section of the rectifying column L, via line 16a.

A concentrated ammonium carbamate solution with 28 weight percent of $H_2O$, consisting of:

| | |
|---|---|
| Ammonium carbamate | 3613 kg |
| $NH_3$ | 578 kg |
| $H_2O$ | 1629 kg | is obtained from the condenser K and returned to the urea synthesis stage via line 17.

The gas phase escaping through lines 21 from separating vessel F is, with 318 kg of water, at 40° C and at atmospheric pressure (delivered through line 22), condensed into a dilute ammonium carbonate solution with 60 weight percent of $H_2O$. Besides water, this solution contains:

| | |
|---|---|
| $NH_3$ | 330 kg |
| $CO_2$ | 187 kg |

Under the above-mentioned conditions of this example, $16.5 \times 10^5$ kcal of heat energy are released per ton of melamine produced and this heat is utilized in the desublimator B by direct contact with the said urea solution containing ammonium carbamate to decompose the latter and expel gases from said solution.

What is claimed is:

1. An integrated system for the preparation of melamine and urea wherein urea is synthesized from $NH_3$ and $CO_2$, with recovery of an ammonium carbamate-containing aqueous solution of urea, and wherein melamine is synthesized from urea with recovery of a melamine vapor-containing synthesis gas stream also containing $NH_3$ and $Co_2$, and wherein the urea formed in said preparation of urea, at least in part, may be used as the starting material for the said preparation of the melamine, and the $NH_3$ and $CO_2$ content of said gas stream formed in said preparation of melamine is, at least in part, used for said preparation of urea, including the combination of process steps for integrated utilization of heat energy within said system consisting essentially in cooling said synthesis gas stream containing hot melamine vapor, in direct contact with said ammonium carbamate-containing aqueous solution of urea, whereby said melamine vapors are desublimated, while utilizing the heat released from said desublimation for the decomposition of said ammonium carbamate, separating melamine crystals from said urea solution now substantially freed from ammonium carbamate, further obtaining a gas stream containing $NH_3$ and $CO_2$ from said decomposition of ammonium carbamate, subsequently condensing said $NH_3$ and $CO_2$ in an aqueous medium to form an ammonium carbamate aqueous solution and recycling the same at least in part to said urea synthesis.

2. Process according to claim 1, wherein the melamine-freed urea solution is processed to form a urea melt which is substantially free from water, and recycling said melt to said melamine synthesis.

3. Process according to claim 2, wherein said melamine-freed urea solution is subjected to a vacuum-crystallization.

4. Process according to claim 3, wherein the heat released during said step of condensing said ammonia and carbon dioxide gas stream is utilized as heat input for said vacuum crystallization.

* * * * *